UNITED STATES PATENT OFFICE.

EMERY ANDREWS, OF KENNEBUNK, MAINE, ASSIGNOR TO THE LEATHEROID MANUFACTURING COMPANY, OF SAME PLACE.

COMPOSITION OF MATTER FOR USE IN THE MECHANIC ARTS.

SPECIFICATION forming part of Letters Patent No. 428,544, dated May 20, 1890.

Application filed November 4, 1889. Serial No. 329,174. (No specimens.)

*To all whom it may concern:*

Be it known that I, EMERY ANDREWS, of Kennebunk, in the county of York and State of Maine, have invented a new and useful Composition of Matter for Use in the Mechanic Arts, of which the following is a specification.

My invention relates to a material for use in the mechanic arts as a substitute for hard rubber, and has for its object the production of a material at a less cost than hard rubber, that may be used successfully as a substitute therefor, and which I term "vulcaloid." Hard rubber is very extensively used in the mechanic arts, particularly as an insulating material in the manufacture of electrical apparatus.

Another material termed "leatheroid" or parchmentized paper has within a few years come into quite extensive use in the mechanic arts, and is a very good substitute for rubber as an insulator; but it cannot be molded by pressure into the forms desired in many instances, and hence such forms have to be cut to the desired shape from a sheet or block, which involves a great deal of waste. The leatheroid or parchmentized paper material is much cheaper than rubber, and hence its use is desirable in many places; but its use is limited by the fact that it cannot be successfully molded to odd and peculiar shapes, and the further fact that it is to some extent affected by moisture. To obviate these objections and produce a good insulating material that shall be cheaper than rubber, and that can be molded to any desired form, I have made this invention, which consists, first, in a composition of finely ground or comminuted leatheroid and rubber mixed in varying proportions of from forty to ninety per cent. of leatheroid to sixty to ten per cent. of rubber for use in the mechanic arts, and from which various articles may be made by molding and vulcanizing.

It further consists in a vulcanized composition composed of finely ground or comminuted leatheroid mixed with rubber in varying proportions, according to the purpose for which it is to be used—say from forty to ninety per cent. of leatheroid, but preferably for most uses in the proportion of about seventy-five or eighty per cent. of leatheroid to twenty-five or twenty per cent. of rubber, molded or rolled to shape and vulcanized.

In carrying out my invention I take scraps or chips of waste leatheroid and grind or otherwise reduce them to fine particles like sawdust, and then mix said finely-comminuted leatheroid with rubber in the desired proportions by kneading the mass in a suitable rubber-working machine until the leatheroid and rubber are thoroughly intermingled, and then it may be molded or rolled to the desired shape and vulcanized. This makes a very good insulating material that can be furnished at much less cost than rubber alone, and has the advantage over pure leatheroid that it can be molded to any desired shape.

It is obvious that the rubber used to form this composite material must have incorporated therein the proper amount of sulphur or other suitable vulcanizing material to enable it to be properly hardened by subjecting it to the action of heat in a well-known manner.

What I claim as new, and desire to secure by Letters Patent of the United States, is—

1. A composition for use in the mechanic arts, composed of finely ground or comminuted leatheroid and rubber mixed in varying proportions of from forty to ninety per cent. of leatheroid to sixty to ten per cent. of rubber.

2. A vulcanized composition for use in the mechanic arts, composed of finely ground or comminuted leatheroid mixed with rubber in varying proportions, according to the use for which it is desired.

In testimony whereof I have signed my name to this specification, in the presence of two subscribing witnesses, on this 30th day of October, A. D. 1889.

EMERY ANDREWS.

Witnesses:
   N. C. LOMBARD,
   STEPHEN MOORE.